US012639200B2

(12) United States Patent (10) Patent No.: US 12,639,200 B2
Sanders et al. (45) Date of Patent: *May 26, 2026

(54) AUTOMATED TRACKING OF CONSISTENT SOFTWARE TEST FAILURES

(71) Applicant: State Farm Mutual Automobile Insurance Company, Bloomington, IL (US)

(72) Inventors: Daniel Joseph Sanders, McKinney, TX (US); Wesley Mao, Murphy, TX (US); Stephen Richard Jones, McKinney, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 161 days.

This patent is subject to a terminal disclaimer.

(21) Appl. No.: 18/404,818

(22) Filed: Jan. 4, 2024

(65) Prior Publication Data

US 2024/0143492 A1 May 2, 2024

Related U.S. Application Data

(63) Continuation of application No. 17/529,021, filed on Nov. 17, 2021, now Pat. No. 11,899,569.

(51) Int. Cl.
*G06F 9/44* (2018.01)
*G06F 11/3668* (2025.01)

(52) U.S. Cl.
CPC ...... *G06F 11/3692* (2013.01); *G06F 11/3688* (2013.01)

(58) Field of Classification Search
CPC .......................... G06F 11/3692; G06F 11/3688
See application file for complete search history.

(56) References Cited

U.S. PATENT DOCUMENTS

| | | | |
|---|---|---|---|
| 2015/0317244 A1 | 11/2015 | Shann et al. | |
| 2017/0116114 A1* | 4/2017 | Tosar | G06F 11/3684 |
| 2018/0300223 A1* | 10/2018 | Neumann | G06F 11/3684 |
| 2019/0004935 A1* | 1/2019 | Gross | G06F 11/3688 |
| 2022/0091969 A1* | 3/2022 | Han | G06F 8/71 |
| 2022/0283891 A1* | 9/2022 | Bolagani | G06F 11/0793 |
| 2023/0153233 A1 | 5/2023 | Sanders | |

OTHER PUBLICATIONS

Office Action for U.S. Appl. No. 17/529,021, mailed on Jun. 2, 2023, Sanders, "Automated Tracking of Consistent Software Test Failures", 18 Pages.

* cited by examiner

*Primary Examiner* — Hang Pan
(74) *Attorney, Agent, or Firm* — Lee & Hayes, P.C.

(57) ABSTRACT

A system that includes a failed test detector and a task updater can automatically update tasks associated with consistent failures of software tests in a software development management platform. The failed test detector can use a set of evidence of test (EOT) files that indicate software testing results over a period of time to identify tests that are consistently failing when executed against versions of a software application. The task updater can automatically create tasks associated with such consistently-failing tests in the software development management platform. The task updater can also automatically close existing tasks associated with tests, in the software development management system, if the failed test detector determines that those tests are no longer failing consistently.

20 Claims, 5 Drawing Sheets

300

AUTOMATED TRACKING OF CONSISTENT SOFTWARE TEST FAILURES

PRIORITY

This application is a continuation of, and claims priority to, U.S. patent application Ser. No. 17/529,021, filed on Nov. 17, 2021, which is hereby fully incorporated by reference herein.

TECHNICAL FIELD

The present disclosure relates to software testing, particularly with respect to automatically updating tasks tracked by a software development management system when software tests fail consistently and/or stop failing consistently.

BACKGROUND

During development of a software application, software developers can prepare tests to verify that the software application operates as expected. Such tests can be associated with unit testing that tests the functionality of a relatively small piece of code, integration testing that tests how multiple pieces of code interact, regression testing that tests the software application after code changes, mutation testing that verifies that a set of tests sufficiently catches errors introduced by altering the source code of the software application, and/or other types of software testing.

A software development management platform can be used during development of the software application to track issues with tests. For example, if a particular test consistently fails during testing of the software application, a task associated with the particular test can be created in the software development management platform. The task can be assigned to a software developer, such that the software developer can investigate why the test is consistently failing, and/or attempt to resolve issues that are preventing the test from passing.

However, managing tasks associated with consistently-failing tests in the software development management platform can be time-intensive, laborious, and complex, particularly when a large number of tests are routinely executed against versions of the software application. For example, if a new version of the software application is generated on a daily basis, a set of hundreds or thousands of tests may be executed daily against each new version of the software application. Because tests results associated with a large number of tests may be produced daily, or on another frequent basis, it can be difficult and/or time-intensive to evaluate each new set of test results to determine if or when individual tests have begun failing consistently, and/or whether tasks associated with consistently-failing tests already exist in the software development management platform or should be created in the software development management platform. It can similarly be difficult and/or time-intensive to evaluate each new set of test results to determine if or when tests that were previously failing consistently have begun passing, and/or whether tasks associated with such now-passing tests exist in the software development management platform and should be closed in the software development management platform.

The example systems and methods described herein may be directed toward mitigating or overcoming one or more of the deficiencies described above.

SUMMARY

Described herein are systems and methods for automatically updating tasks, tracked by a software development management system, that are associated with tests that consistently fail during testing of a software application. A failed test detector can use a set of evidence of test (EOT) files that indicate software testing results over a period of time to identify tests that are consistently failing when executed against versions of the software application. A task updater associated with the failed test detector can automatically create tasks associated with such consistently-failing tests in the software development management platform. The tasks can be assigned to software developers in the software development management platform, such that the software developers can investigate why the tests are consistently failing and attempt to resolve issues preventing the tests from passing. The task updater can also automatically close existing tasks associated with tests in the in the software development management platform, if the failed test detector determines that those tests are no longer failing consistently.

According to a first aspect, a computer-implemented method includes receiving, by one or more processors, a set of EOT files indicating results of a plurality of tests executed against versions of a software application over a period of time. The computer-implemented method also includes identifying, by the one or more processors, a consistently-failing test in the plurality of tests, by determining that the set of EOT files indicates that the consistently-failing test failed consistently over the period of time. The computer-implemented method further includes retrieving, by the one or more processors, a task list indicating active tasks, associated with identified consistently-failing tests in the plurality of tests, tracked by a software development management platform. The computer-implemented method additionally includes determining, by the one or more processors, that the consistently-failing test is not associated with the active tasks. The computer-implemented method also includes creating, by the one or more processors, a new task associated with the consistently-failing test in the software development management platform, wherein the new task is assignable to a developer in the software development management platform.

According to a second aspect, one or more computing devices include one or more processors and memory. The memory stores computer-executable instructions that, when executed by the one or more processors, cause the one or more processors to perform operations. The operations include receiving a set of EOT files indicating results of a plurality of tests executed against versions of a software application over a period of time, identifying consistently-failing tests, in the plurality of tests, by determining that the set of EOT files indicates that the consistently-failing tests failed consistently over the period of time. The operations also include generating a failed test list that identifies the consistently-failing tests. The operations further include retrieving a task list from a software development management platform, wherein the task list indicates active tasks, associated with identified consistently-failing tests in the plurality of tests, tracked by the software development management platform. The operations additionally include opening new tasks, in the software development management platform, that correspond to individual consistently-failing tests indicated in the failed test list that are not associated with the active tasks. The new tasks are assignable to one or more developers in the software development management platform. The operations also include identifying a set of existing tasks, indicated by the task list, that correspond with tests that are not identified in the failed test list, and closing the set of existing tasks in the software development management platform.

According to a third aspect, one or more non-transitory computer-readable media store computer-executable instructions. The computer-executable instructions, when executed by one or more processors, cause the one or more processors to perform operations. The operations include receiving a set of EOT files indicating results of a plurality of tests executed against versions of a software application over a period of time. The operations also include identifying consistently-failing tests, in the plurality of tests, by determining that the set of EOT files indicates that the consistently-failing tests failed consistently over the period of time. The operations further include generating a failed test list that identifies the consistently-failing tests. The operations also include retrieving a task list from a software development management platform, wherein the task list indicates active tasks, associated with identified consistently-failing tests in the plurality of tests, tracked by the software development management platform. The operations further include opening new tasks, in the software development management platform, that correspond to individual consistently-failing tests indicated in the failed test list that are not associated with the active tasks. The new tasks are assignable to one or more developers in the software development management platform. The operations also include identifying a set of existing tasks, indicated by the task list, that correspond with tests that are not identified in the failed test list, and closing the set of existing tasks in the software development management platform.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
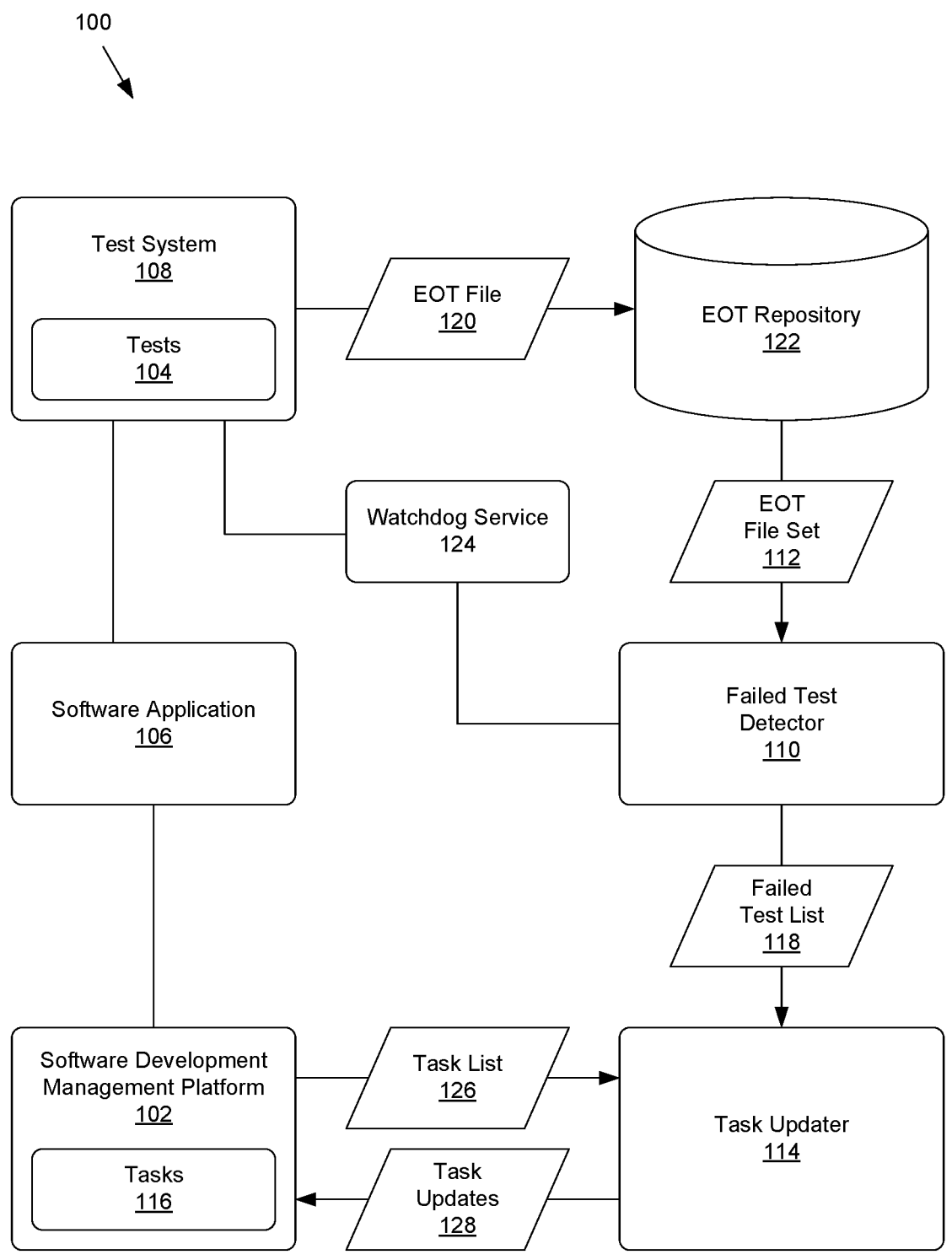
FIG. 1 shows an example of a system configured to automatically update a software development management platform based on information indicating whether tests associated with a software application have been consistently failing.

FIG. 1 shows an example of a system 100 configured to automatically update a software development management platform 102 based on information indicating whether tests 104 associated with a software application 106 have been consistently failing. A test system 108 can execute tests 104 in association with versions of the software application 106. A failed test detector 110 can configured to use an EOT file set 112 to determine whether, and which, tests 104 executed by the test system 108 have been consistently failing over a period of time. A task updater 114 can be configured to update tasks 116 tracked by the software development management platform 102, based on a failed test list 118 generated by the failed test detector 110. For example, if the failed test list 118 indicates that a first test has been consistently failing, and the software development management platform 102 does not already have a task associated with failure of the first test, the task updater 114 can create a new task associated with the first test in the software development management platform 102. As another example, if the software development management platform 102 is tracking a task associated with a second test that had previously been failing consistently, but the failed test list 118 does not include the second test, bugs or other issues that had been causing the second test to fail may have been resolved. Accordingly, the task updater 114 can close the task associated with the second test, or otherwise mark the task as complete, in the software development management platform 102.

The software application 106 can be a web application associated with a website, a backend system for a website, an enterprise application, an application that executes locally on a computer, a mobile application, or any other type of software application. Source code for the software application 106 can be written in Java®, Python®, C++, C#, or any other programming language.

The software development management platform 102 can be configured to manage information associated with development of the software application 106. The software development management platform 102 can be used during development of the software application 106 to track status information and other information about components of the software application 106, to assign work to one or more software developers, and/or otherwise manage development of the software application 106. As a non-limiting example, the software development management platform 102 can be an application known as VersionOne®. However, in other examples, the software development management platform 102 can be GitLab®, Jira®, or any other type of software development management platform.

As discussed above, the software development management platform 102 can be configured to track tasks 116 associated with development of the software application 106. Tasks 116 can be associated with work tasks that can be assigned to software developers, components of the software application 106 that are under development or are to be developed, bugs or other issues associated with the software application 106 that are to be resolved, and/or other aspects of the software application 106.

In some examples, the software development management platform 102 can arrange the tasks 116 in a hierarchy. For instance, if the software application 106 is being developed according to an agile development methodology, the tasks 116 can include a hierarchy of epics, features, and/or stories. Epics can be high-level concepts or components associated with development of the software application 106. An epic can be broken down into one or more features that can be more specific and/or narrower in scope than the epic. A feature can similarly be divided into one or more stories that can be more specific and/or narrower in scope than the feature.

The test system 108 can be configured to execute tests 104 in association with versions of the software application 106. In some examples, the test system 108 can be based on a testing framework such as JUnit™. Versions of the software application 106 can be compiled or otherwise created based on source code for the software application, for instance when a commit and/or merge occurs to incorporate changes to the source code by one or more software developers. The test system 108 can be configured to execute tests 104 against versions of the software application 106, for instance when new versions of the software application 106 are created. The tests 104 can include a suite of test cases associated with unit testing, integration testing, regression testing, mutation testing, and/or other types of testing of the software application 106.

The test system 108 can be configured with a large number of tests 104 to execute against versions of the software application 106, such as hundreds of tests 104, thousands of tests 104, tens of thousands of tests 104, or any other number of tests 104. As a non-limiting example, the software application 106 can be an automobile insurance policy quoting application that receives user input and generates a quote for a new automobile insurance policy based on the user input. The automobile insurance policy quoting application can be designed to generate automobile insurance policy quotes for residents of multiple states, but each state may have different rules, regulations, and/or other factors that impact how automobile insurance quotes are generated for residents of that state. For example, the automobile insurance policy quoting application may be configured to use a first algorithm that takes a first set of factors into account when generating a quote for a resident of California, but be configured to use a different second algorithm that takes a second set of factors into account when generating a quote for a resident of Texas. Accordingly, there may be a large number of tests 104 in part because different subset of the tests 104 are designed to test different implementations, algorithms, or use cases associated with different states or localities. As another example, there may be a large number of tests 104 in part because different subsets of the tests 104 are designed to test different types of front-end user interfaces that interact with the same back-end portion of the software application 106, such as different sets of tests 104 associated with interactions of the back-end portion of the software application 106 with a website, a mobile application, or other types of front-end user interfaces.

Although in some examples or situations the test system 108 can be configured to execute a relatively small number of the tests 104 that specifically correspond with new code changes in a new version of the software application 106, the test system 108 can be configured to routinely execute the full set of tests 104, or a consistent subset of the tests 104, against a most recent version of the software application 106. For example, the test system 108 can be configured to perform regression testing by executing the full set of tests 104 against the latest version of the software application 106 once per day, on-demand, or on any other periodic, occasional, or scheduled basis.

As a non-limiting example, the software application can be developed according to an agile development methodology, such that small components of the software application 106 are incrementally developed on a rapid basis. New iterative versions of the software application 106 with bug fixes, new features, and/or other changes can thus be generated according to a daily deployment schedule, or on another frequent basis. The test system 108 can accordingly be used to frequently test new versions of the software application 106, for instance on a daily basis or when each new candidate release version of the software application 106 is generated.

When the test system 108 executes tests 104 against a version of the software application 106, individual tests 104 can pass or fail. Individual tests 104 can fail for a variety of reasons. For example, a test can fail because of a bug or other issue with the version of the software application 106 itself. As another example, a test can fail because of a bug or other issue with the test itself. In other examples, a test can fail because of an issue with the test system 108, an issue with a test environment in which the tests 104 are executed, an issue with a related service or application, or for any other reason. For instance, if a particular test is designed to verify that the software application 106 can retrieve data from a web service, the test may fail if the web service is offline at the time the test is executed and the software application 106 is unable to retrieve the data from the web service.

The test system 108 can generate an EOT file 120 that indicates results of the tests 104 executed against a version of the software application 106. The EOT file 120 can be JavaScript Object Notation (JSON) file, an Extensible Markup Language (XML) file, or any other type of file. The EOT file 120 can include data about each of the tests 104 that were executed against the version of the software application 106. For example, for a particular test, the EOT file 120 can identify a title of the test, a source code file associated with the test, an indication of whether the test passed or failed, an execution time of the test, and/or other information about the test and/or execution of the test. In some examples, if a particular test failed, the EOT file 120 can include an error code and/or other context data associated with failure of the test.

The test system 108 can store the EOT file 120 in an EOT repository 122. The EOT repository 122 can be a database, directory, memory location, cloud storage location, or other data storage element configured to store EOT files. The EOT repository 122 can accordingly store the EOT file 120 generated by the test system 108 based on tests 104 executed against a current or recent version of the software application 106, as well as other EOT files previously generated by the test system 108 when the tests 104 were executed against previous versions of the software application 106.

The failed test detector 110 can be configured to retrieve the EOT file set 112 from the EOT repository 122. For example, the failed test detector 110 can use an Application Programming Interface (API) associated with the EOT repository 122 to request and receive the EOT file set 112. The EOT file set 112 can include multiple EOT files that are associated with the same tests 104 executed against versions of the software application 106, such as the most recently-generated EOT file and one or more previously-generated EOT files stored in the EOT repository 122. The EOT file set 112 can include two EOT files, three EOT files, four EOT files, or any other number of EOT files. As a non-limiting example, the EOT file set 112 can include the three most recent EOT files that correspond to the same set of tests 104 executed against versions of the software application 106. In some examples, the number of EOT files retrieved by the failed test detector 110 in the EOT file set 112 can be configurable.

As discussed above, the test system 108 can be configured to execute the full set of tests 104, or at least a consistent subset of the tests 104, against the latest version of the software application 106 once a day, on demand, or on any other basis or schedule. As a non-limiting example, if a new version of the software application 106 is generated daily, the test system 108 can execute the full set of tests 104 once per day against each new version of the software application 106. Accordingly, the EOT file set 112 retrieved by the failed test detector 110 can include EOT files that indicate results of a consistent set, or subset, of tests 104 in association with different versions of the software application 106 over a period of time.

Although FIG. 1 shows the failed test detector 110 receiving the EOT file set 112 from the EOT repository 122, in other examples the failed test detector 110 can receive the EOT file set 112 from another source. For instance, the failed test detector 110 can be configured to operate on a user-provided or user-specified EOT file set 112 that is not associated with the EOT repository 122. As a non-limiting example, the failed test detector 110 can have a user interface that allows a user to import a user-provided EOT file set 112 into the failed test detector 110 from a GitHub® repository, from another source accessible over a network, from a memory storage device, or from any other data storage location different from the EOT repository 122.

The failed test detector 110 can be configured to detect and identify any consistently-failing tests among the tests 104, based on tests 104 that are marked as having failed in all of the EOT files in the EOT file set 112. For example, if the EOT file set 112 contains the three most recent EOT files, and the three EOT files each indicate that four particular tests 104 failed, the failed test detector 110 can determine that those four particular tests 104 consistently failed the last three times the tests 104 were executed against versions of the software application 106.

In some examples, the failed test detector 110 can parse through a first EOT file of the EOT file set 112 and identify the titles and/or other identifiers of all of the tests 104 that are marked as having failed in the first EOT file. The failed test detector 110 can parse through the other EOT files in the EOT file set 112 to search for the titles and/or other identifiers of the tests 104 marked as having failed in the first EOT file, and can determine whether the remainder of the EOT files also indicate that those tests 104 failed. If all of the EOT files in the EOT file set 112 indicate that particular tests 104 failed, the failed test detector 110 can determine that those tests 104 have been consistently failing, as discussed further below with respect to FIG. 2.

As discussed above, the failed test detector 110 can generate the failed test list 118. The failed test list 118 can include titles and/or other identifiers of any tests 104 that the failed test detector 110 determines have been consistently failing, based on information in the EOT file set 112. In some examples, the failed test list 118 can indicate other information about the identified consistently-failing tests, such as identifiers of epics, features, and/or other types of tasks 116 associated with the tests 104 in the software development management platform 102, identifiers of teams and/or software developers associated with the tests 104, tags associated with the tests 104, and/or other information. For instance, tags associated with the tests 104 in the failed test list 118 can indicate that the tests 104 have been determined to be consistently-failing tests. The failed test detector 110 can provide the failed test list 118 to the task updater 114, such that the task updater 114 can use the failed test list 118 to update tasks 116 associated with the tests 104 in the software development management platform 102 as described further below.

In some examples, the failed test detector 110 can be configured to omit detected consistently-failing tests from the failed test list 118 if a watchdog service 124 indicates that the consistently-failing tests failed due to an issue that is not caused by the source code of the software application 106 or the tests 104. The watchdog service 124 can be a component of the test system 108, or a separate system, that is configured to monitor external components that are called or referenced during execution of the tests 104 by the test system 108, such that the watchdog service 124 can determine whether any of the external components are inaccessible during execution of the tests 104. The external components can include web services, other services, applications, databases, and/or other elements separate from the software application 106. If the watchdog service 124 indicates that an external component was offline or otherwise inaccessible when a corresponding test was executed, the test may have failed due to the inaccessibility of the external component rather than an issue with the test or the software application 106 itself. The failed test detector 110 can be configured to omit a test from the failed test list 118 if the watchdog service 124 indicates that an external component associated with the test was offline when the EOT files in the EOT file set 112 were generated. Accordingly, because a test that failed due to an inaccessible external component rather than an issue with the test or the software application 106 can be omitted from the failed test list 118 based on information from the watchdog service 124, the task updater 114 can avoid opening a new task associated with that test in the software development management platform 102.

The task updater 114 can be configured to receive the failed test list 118 from the failed test detector 110. The task updater 114 can also be configured to interface with the software development management platform 102 to receive data from the software development management platform 102 and to provide data to the software development management platform 102. For example, the task updater 114 can be configured to use an API to interact with the software development management platform 102, for instance through a Representational State Transfer (REST) endpoint associated with the software development management platform 102.

Before or after the task updater 114 receives the failed test list 118 from the failed test detector 110, the task updater 114 can also retrieve a task list 126 from the software development management platform 102. The task list 126 can indicate open tasks 116 associated with consistently-failing tests that have previously been identified. For example, the software development management platform 102 can have an epic and/or feature that includes stories associated with consistently-failing tests. Accordingly, the task list 126 can include information associated with all of the stories associated with that epic and/or feature. In some examples, an identifier of the epic and/or feature associated with consistently-failing tests in the software development management platform 102 can be included in the failed test list 118 by the failed test detector 110.

The task updater 114 can use the task list 126 to determine whether the software development management platform 102 has open tasks 116 associated with each of the consistently-failing tests indicated in the failed test list 118. If any of the consistently-failing tests indicated in the failed test list 118 are not associated with open tasks 116 indicated by the task list 126, the task updater 114 can provide task updates 128 to the software development management platform 102 that cause the software development management platform 102 to open new tasks 116 associated with the consistently-failing tests.

For example, if the EOT file set 112 indicated that a particular test has been consistently failing, the failed test list 118 can include an identifier of that particular test. If the task list 126 does not include an identifier of that particular test, the particular test may not previously have been failing consistently, and the software development management platform 102 may not have an open task associated with the particular test. Accordingly, the task updater 114 can transmit a task update to the software development management platform 102 that cause the software development management platform 102 to open a new task associated with the particular test.

In some examples, a task update associated with a test can include information about that test that was provided in the EOT file set 112 and/or the failed test list 118, such as a title or other identifier of the test, an error code and/or other context data associated with failure of the test, identifiers of an epic and/or feature associated with the test in the software development management platform 102, an identifier of a team or software developer associated with the test, one or more tags associated with the particular test, and/or any other information about the particular test. The software development management platform 102 can use the information about the test provided in the task update to create a new active task, such as a new story, associated with the test. The new task can be assigned to a software developer in the software development management platform 102, such that the software developer can investigate why the test has been consistently failing and attempt to resolve any issues with the test, the software application 106, the test system 108, the test environment, and/or other systems that may be preventing the test from passing.

If the task list 126 identifies any open tasks 116 associated with tests 104 that had previously been identified as consistently-failing, but the failed test list 118 does not identify those tests 104, the tests 104 may no longer be failing consistently. The task updater 114 can accordingly provide corresponding task updates 128 to the software development management platform 102 that cause the software development management platform 102 to close existing open tasks 116 associated with the tests 104 that are no longer failing consistently.

For example, a bug or other issue with a particular test, the software application 106, or another system may previously have been causing the particular test to fail consistently. A task associated with the particular test may have been opened in the software development management platform 102, such that issues with the particular test could be tracked, investigated, and potentially be resolved. If issues that had previously been preventing the particular test from passing have now been resolved, the particular test may no longer be failing consistently, and accordingly the particular test may not be indicated in the failed test list 118. Accordingly, because issues associated with the particular test may have been resolved, the task updater 114 can provide task updates 128 to the software development management platform 102 that cause the software development management platform 102 to close the task associated with the particular test.

By closing an existing task in the software development management platform 102 that is associated with a test that is no longer consistently failing, further work associated with that task can be avoided. For instance, when a task associated with a test is closed because that test is no longer consistently failing and issues associated with the test have likely been resolved, the task may no longer be assignable to software developers in the software development management platform 102, or the task can be removed from a list of open tasks 116 already assigned to a particular software developer. Accordingly, software developers can be assigned to work on other tasks 116 that have outstanding issues that have not yet been resolved, instead of investigating issues with the test that have likely already been resolved.

As a non-limiting example, a particular test may have been consistently failing because the test verifies whether the software application 106 can communicate with a separate service. The test may have failed consistently during a period of time when the separate service was offline. Accordingly, a task associated with the test may have been opened in the software development management platform 102 due to the consistent failure of the test, for instance if the watchdog service 124 is not present or is not used by the failed test detector 110. However, once the separate service comes back online, the test can begin passing. The failed test detector 110 therefore would not identify the test as a consistently-failing test during a next evaluation of an EOT file set, and would omit the test from the next failed test list. The task updater 114 can determine that the open task associated with the test in the software development management platform 102 does not correspond with any tests indicated in the next failed test list, and can close that task in the software development management platform 102. Accordingly, because issues with the separate service that had been causing consistent failures of the test have been resolved, the corresponding task in the software development management platform 102 can be automatically closed.

Tasks 116 opened in the software development management platform 102 by the task updater 114 for consistently-failing tests can be associated with a designated epic and/or feature that is associated with consistently-failing tests, and/or can be associated with a particular tag or other information indicating that the tests were automatically identified as a consistently-failing tests. The software development management platform 102 can be configured to identify and analyze such tasks 116 associated with consistently-failing tests over time. For example, the software development management platform 102 can be configured to determine how many tasks 116 associated with consistently-failing tests are open at a particular time and/or on average, how long individual tasks 116 associated with consistently-failing tests are open before being closed, an average amount of time it takes for tasks 116 associated with consistently-failing tests to be closed, and/or other types of metrics.

In some examples, the failed test detector 110 and the task updater 114 can be separate applications. For example, the failed test detector 110 can be a first application configured to retrieve the EOT file set 112 from the EOT repository 122, or receive the EOT file set 112 from another source, to compare EOT files in the EOT file set 112 to identify any consistently-failing tests indicated by those EOT files, and to generate the failed test list 118 that indicates such consistently-failing tests. The task updater 114 can be a second application that is configured to receive the failed test list 118 from the failed test detector 110, and is configured to interface with the software development management platform 102 to receive the task list 126 and provide task updates 128 based on the failed test list 118. In other examples, the failed test detector 110 and the task updater 114 can be components of a single application that is configured to receive the EOT file set 112 from the EOT repository 122 or another source, and is also configured to interface with the software development management platform 102. In still other examples, the failed test detector 110 and the task updater 114 can be components of a plug-in or other extension to the software development management platform 102, such that the software development management platform 102 can use the failed test detector 110 and the task updater 114 to automatically update tasks 116 based on identifying consistently-failing tests associated with the software application 106.

As discussed above, the failed test detector 110 can use the EOT file set 112 to identify consistently-failing tests to be included in the failed test list 118, and the task updater 114 can use the failed test list 118 to provide task updates 128 to the software development management platform 102. An example of the failed test detector 110 evaluating the EOT file set 112 to identify consistently-failing tests is discussed further below with respect to FIG. 2.

Figure 2:
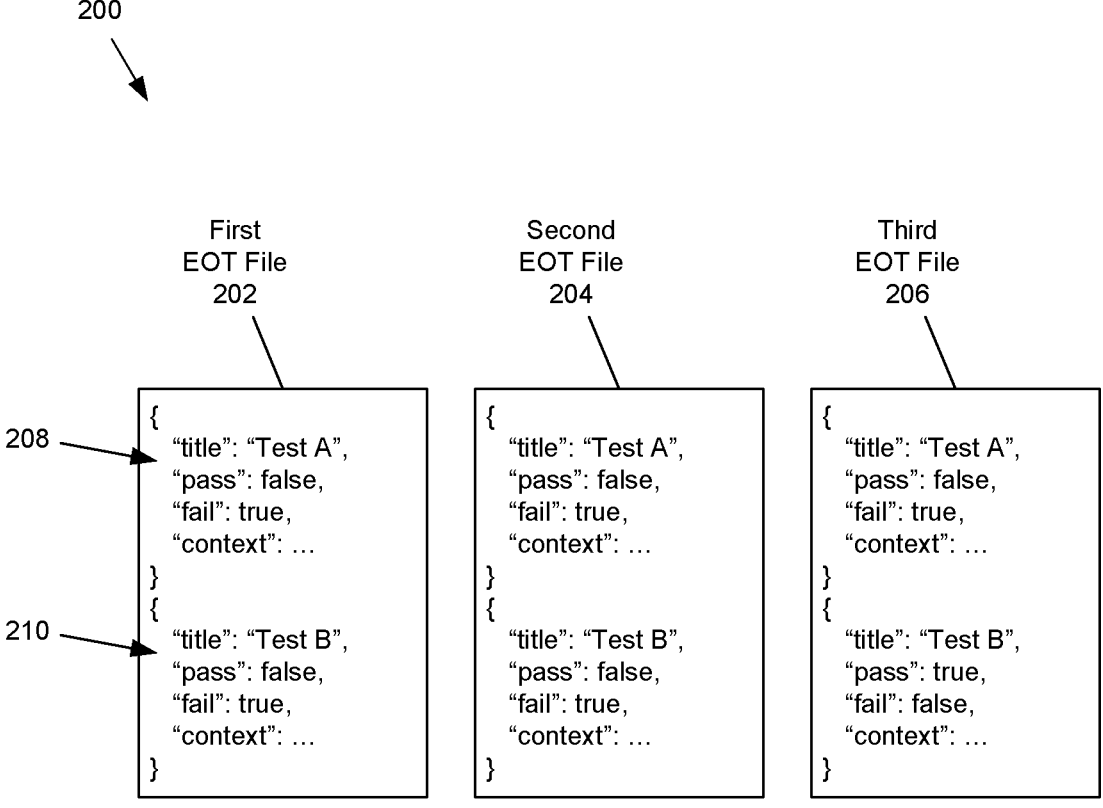
FIG. 2 shows an example evidence of test file set that includes three evidence of test files, which a failed test detector can use to identify consistently-failing tests.

FIG. 2 shows an example EOT file set 200 that includes three EOT files, which the failed test detector 110 can use to identify consistently-failing tests. The EOT file set 200 can be an instance of the EOT file set 112 discussed above with respect to FIG. 1, and can be received by the failed test detector 110 from the EOT repository 122 or another source. The EOT file set 200 can include a first EOT file 202, a second EOT file 204, and a third EOT file 206. In some examples, the three EOT files in the EOT file set 200 can be the three most recent EOT files stored in the EOT repository 122, and can correspond with the three most recent versions of the software application 106 that were tested by the test system 108 using a set of tests 104. In this example, the first EOT file 202 can be the oldest of the three EOT files in the EOT file set 200, and the third EOT file 206 can be the newest of the three EOT files in the EOT file set 200.

Each of the EOT files in the EOT file set 200 can indicate tests results associated with a consistent set of tests 104, such as the full set of tests 104 or at least a consistent subset of the tests 104. For example, the EOT files in the EOT file set 200 can each indicate results for a first test 208, a second test 210, and/or other tests 104.

As described above, the failed test detector 110 can determine which tests 104 have been consistently failing based on the EOT file set 200. For example, the failed test detector 110 can determine that the first test 208 is a consistently-failing test because the first EOT file 202, the second EOT file 204, and the third EOT file 206 each indicate that the first test 208 failed. Accordingly, the failed test detector 110 can add information associated with the first test 208 to the failed test list 118, such that the task updater 114 can create a task in the software development management platform 102 associated with the first test 208 (if the software development management platform 102 does not already have an open task associated with the first test 208).

As another example, the failed test detector 110 can determine that the second test 210 is not a consistently-failing test based on the EOT file set 200. Although the first EOT file 202 and the second EOT file 204 both indicate that the second test 210 failed, the most recent third EOT file 206 indicates that the second test 210 passed. Accordingly, because the three EOT files in the EOT file set 200 do not consistently indicate that the second test 210 failed, the failed test detector 110 can determine that the second test 210 is not a consistently-failing test.

In some examples, a previous EOT file set that included the first EOT file 202, the second EOT file 204, and a fourth EOT file that predated the first EOT file 202 may have indicated that the second test 210 was a consistently-failing test. However, because the more recent EOT file set 200 includes the more recent third EOT file 206 that indicates that the second test 210 passed, the second test 210 can be determined to no longer be a consistently-failing test.

The failed test detector 110 can omit information associated with the second test 210 from the failed test list 118 because the EOT file set 200 indicates that the second test 210 is not a consistently-failing test. If the task updater 114 determines that a task associated with the second test 210 is open in the software development management platform 102, the task updater 114 can close that task in the software development management platform 102 because the failed test detector 110 determined that the second test 210 is not a consistently-failing test and omitted the second test 210 from the failed test list 118.

The failed test detector 110 can similarly omit any other test from the failed test list 118 if at least one of the first EOT file 202, the second EOT file 204, or the third EOT file 206 in the EOT file set 200 indicates that the test passed. For example, if the first EOT file 202 and the third EOT file 206 both indicate that a particular test failed, but the second EOT file 204 indicates that the particular test passed, the failed test detector 110 can determinate that the particular test is not a consistently-failing test and can omit the particular test from the failed test list 118.

As shown in FIG. 2, the failed test detector 110 can evaluate the EOT file set 200 to identify consistently-failing tests to be included in the failed test list 118. An example process that the failed test detector 110 can use to evaluate the EOT file set 200 and generate the failed test list 118 is discussed further below with respect to FIG. 3.

Figure 3:
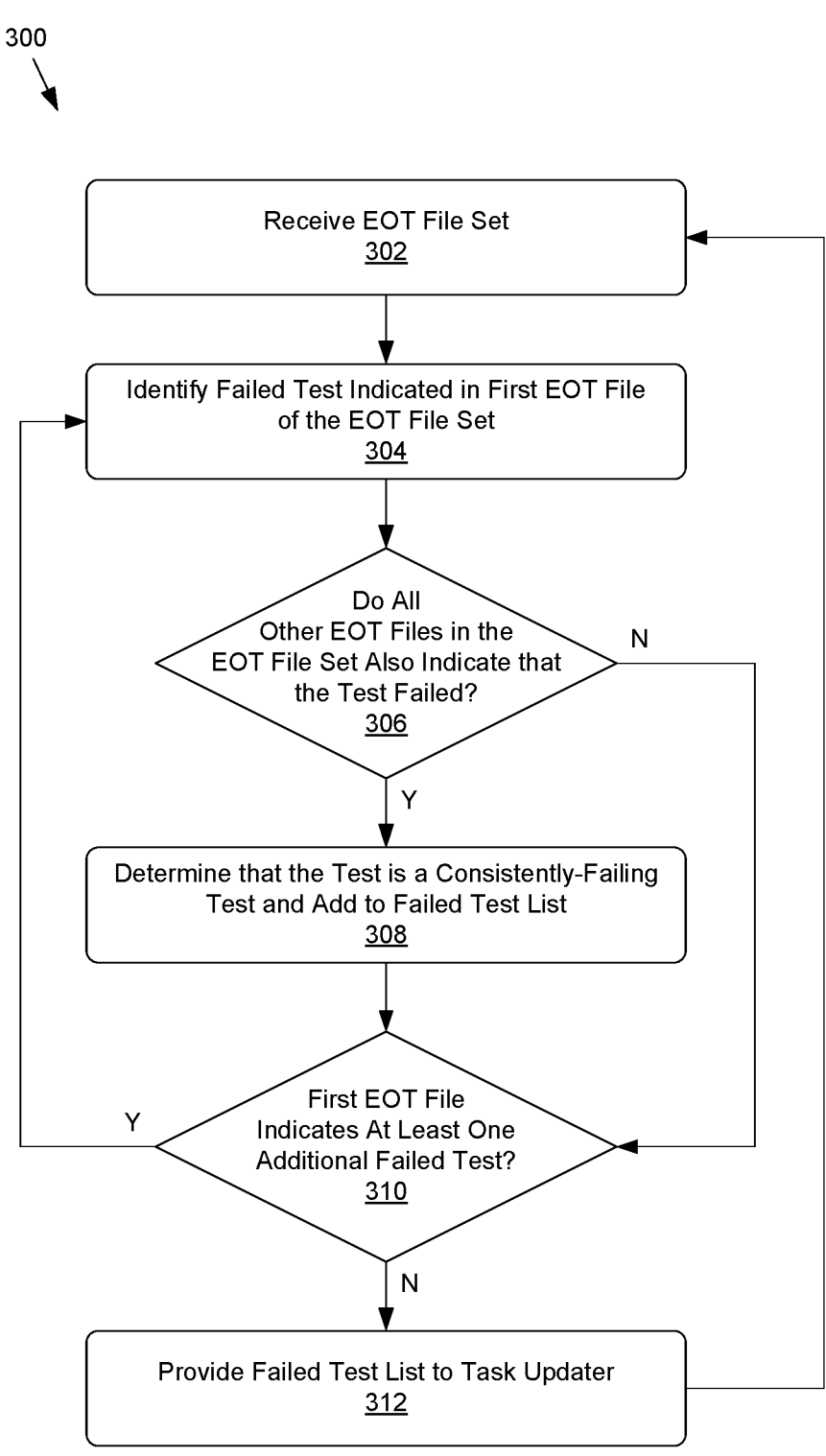
FIG. 3 shows a flowchart of an example process for identifying consistently-FIG. failing tests.

FIG. 3 shows a flowchart of an example process 300 for identifying consistently-failing tests. Process 300 can be implemented by the failed test detector 110, executing on one or more computing devices. An example system architecture for such a computing device is described below with respect to FIG. 5.

At block 302, the failed test detector 110 can receive the EOT file set 112. The EOT file set 112 can include multiple EOT files that indicate testing results generated by using the tests 104 to test versions of the software application 106 over a period of time. As a non-limiting example, the EOT file set 112 can include a set of EOT files generated daily by the test system 108 by executing the tests 104 against new versions of the software application 106 generated each day.

In some examples, the failed test detector 110 can retrieve the EOT file set 112 from the EOT repository 122 at block 302. For example, if the test system 108 is configured to test versions of the software application daily, the failed test detector 110 can be configured to, once a day, retrieve an EOT file set from the EOT repository 122 that includes the three latest EOT files produced by the test system 108. As another example, the failed test detector 110 can be configured to automatically check if a new EOT file has been added to the EOT repository 122. If the failed test detector 110 finds a new EOT file in the EOT repository, the failed test detector 110 can be configured to automatically retrieve a new EOT file set that includes that new EOT file and one or more preceding EOT files stored in the EOT repository 122. In other examples, the failed test detector 110 can receive a user-provided EOT file set at block 302, or receive an EOT file set from any other source.

At block 304, the failed test detector 110 can identify a failed test indicated in a first EOT file of the EOT file set 112. The failed test detector 110 can also determine at block 306 whether all of the other EOT files of the EOT file set 112 also indicate that the test identified at block 304 failed. For example, the failed test detector 110 can be configured to parse through one of the EOT files in the EOT file set 112 and identify a test that the EOT file indicates failed. The failed test detector 110 can then determine whether the remainder of the EOT files in the EOT file set 112 all also indicate that the test failed.

If all of the other EOT files in the EOT file set 112 indicate that the test identified at block 304 failed (Block 306—Yes), the failed test detector 110 can determine at block 308 that the test identified at block 304 is a consistently-failing test. The failed test detector 110 can accordingly add information associated with the consistently-failing test to the failed test list 118, and move to block 310. In some examples, the failed test detector 110 can be configured to omit the consistently-failing test from the failed test list 118 at block 308 if the watchdog service 124 indicates that the test has been consistently failing because of an inaccessible external component. However, if the watchdog service 124 is not used, or if the watchdog service 124 does not indicate that the test has been consistently failing because of an inaccessible external component, the failed test detector 110 can add the consistently-failing test to the failed test list 118 at block 308.

If the first EOT file indicates that the test failed, but the other EOT files in the EOT file set 112 do not all indicate that the test failed (Block 306—No), the failed test detector 110 can omit information associated with the test from the failed test list 118, and can move to block 310. For example, if the first EOT file of the EOT file set 112 indicates that a particular test failed, but at least one of the other EOT files of the EOT file set 112 indicates that the particular test passed, the failed test detector 110 can determine that the particular test is not a consistently-failing test, and can omit the particular test from the failed test list 118.

At block 310, the failed test detector 110 can determine whether the first EOT file of the EOT file set 112 indicates at least one additional failed test that has not yet been evaluated by the failed test detector 110. If the first EOT file indicates at least one additional failed test (Block 310—Yes), the failed test detector 110 can return to block 304 to identify one of the additional failed tests, and determine at block 306 whether all of the other EOT files in the EOT file set 112 also indicate that the additional failed test failed. Accordingly, the failed test detector 110 can loop through blocks 304 through 310 to identify all of the tests 104 that the EOT files of the EOT file set 112 indicate are consistently failing, and to add the identified consistently-failing tests to the failed test list 118. In other examples, the failed test detector 110 can identify a set of failed tests indicated in the first EOT file at block 304, determine at block 306 which tests in that set are also indicated as failing in all of the other EOT files in the EOT file set 112, and add those tests to the failed test list 118 at block 308.

If the first EOT file does not indicate at least one additional failed test that has not yet been evaluated by the failed test detector 110 (Block 310—Yes), or if the failed test detector 110 has otherwise identified all of the tests that the EOT file set 112 indicates are consistently failing, the failed test detector 110 can finalize the failed test list 118 and provide the failed test list 118 to the task updater 114 at block 312. The failed test detector 110 can also return to block 302 to receive a new EOT file set, such that the failed test detector 110 can repeat process 300 for a different set of EOT files. The new EOT file set can include one or more of the same EOT files included in the preceding EOT file set, but can include one or more newer EOT files.

After the failed test detector 110 provides the failed test list 118 to the task updater 114 at block 312, the task updater 114 can use the failed test list 118 to update data associated with the tasks 116 maintained by the software development management platform 102. For example, as discussed further below with respect to FIG. 4, the task updater 114 can create new tasks 116 for any consistently-failing tests indicated in the failed test list 118 that are not already associated with tasks 116, and/or can close out existing tasks 116 associated with tests that are not indicated as consistently failing in the failed test list 118.

Figure 4:
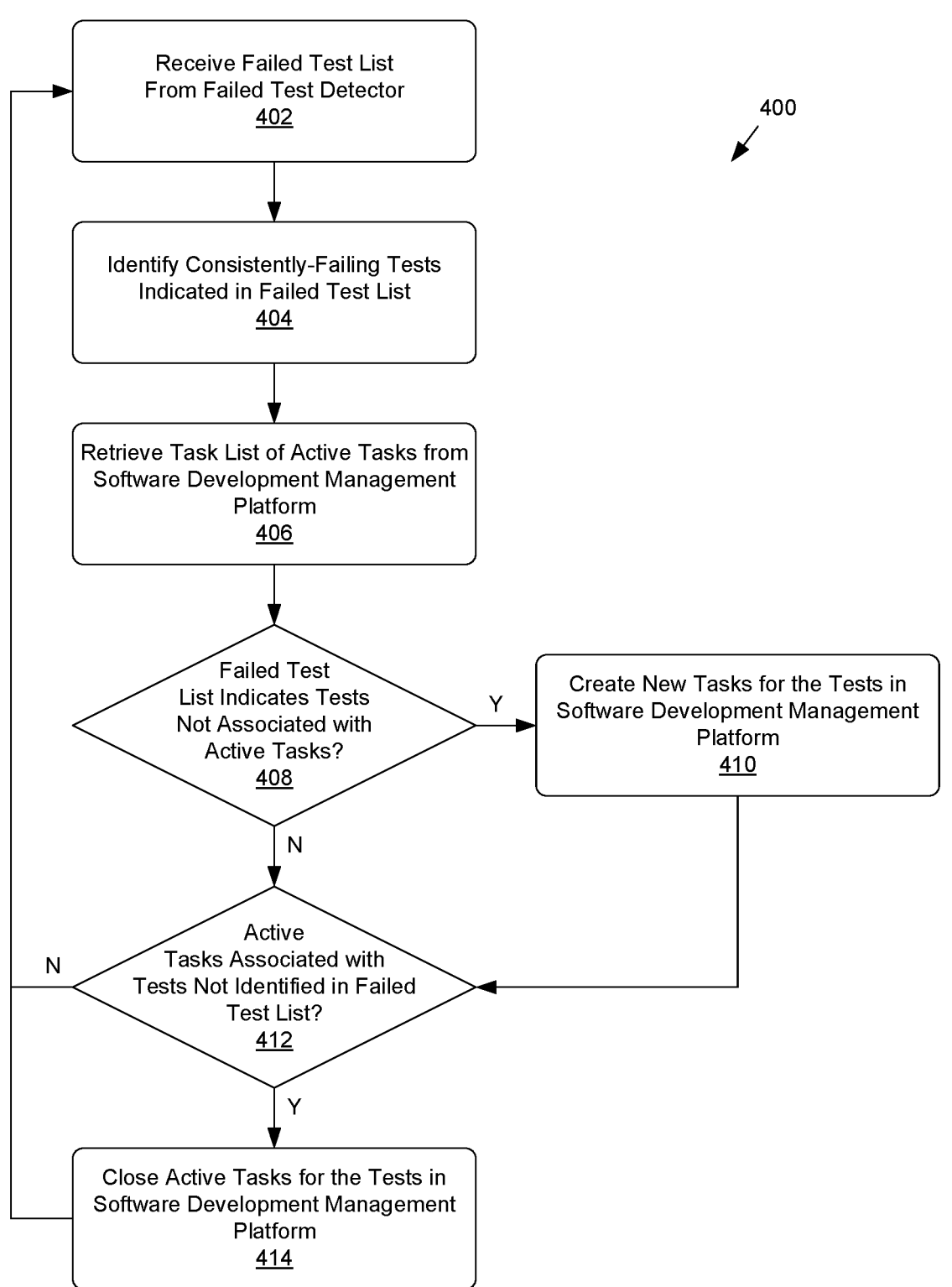
FIG. 4 shows a flowchart of an example process for automatically updating data associated with tasks maintained by a software development management platform based on a failed test list generated by a failed test detector.

FIG. 4 shows a flowchart of an example process 400 for automatically updating data associated with the tasks 116 maintained by the software development management platform 102 based on the failed test list 118 generated by the failed test detector 110. Process 300 can be implemented by the task updater 114, executing on one or more computing devices. An example system architecture for such a computing device is described below with respect to FIG. 5.

At block 402, the task updater 114 can receive the failed test list 118 from the failed test detector 110. For example, the failed test detector 110 can use the process 300 described above with respect to FIG. 3 to identify consistently-failing tests based on the EOT file set 112, and can provide the failed test list 118 that indicates the identified consistently-failing tests to the task updater 114. Accordingly, the task updater 114 can identify the consistently-failing tests indicated in the failed test list 118 at block 404.

At block 406, the task updater 114 can retrieve a task list 126 from the software development management platform 102. The task list 126 can indicate current active tasks 116 associated with tests 104. For example, a particular feature and/or epic can be generally associated with issues related to the tests 104 in the software development management platform 102, while individual stories associated with that particular feature and/or epic can correspond with issues associated with individual tests 104. Accordingly, the task updater 114 can request that the software development management platform provide the task list 126 that includes all the stories associated with that particular feature and/or epic.

At block 408, the task updater 114 can determine whether the failed test list 118 received at block 402 identifies any consistently-failing tests that are not associated with active tasks 116 indicated by the task list 126. If the failed test list 118 identifies any consistently-failing tests that are not associated with active tasks 116 (Block 408—Yes), the task updater 114 can create new tasks 116 associated with those consistently-failing tests in the software development management platform 102 at block 410.

For example, the task updater 114 can transmit task updates 128 to the software development management platform 102 that cause the software development management platform 102 to open new tasks 116 associated with the consistently-failing tests. The task updates 128 can identify the consistently-failing tests, and request that the software development management platform 102 open new tasks 116 associated with the consistently-failing tests. The task updates 128 can also indicate other information about the consistently-failing tests, such as titles of the tests, error codes and/or other context data associated with failure of the tests, identifiers of an epic and/or feature associated with the tests in the software development management platform 102, identifier of teams and/or software developers associated with the tests, tags associated with the tests, and/or any other information about the particular tests. The software development management platform 102 can use the information about the tests provided in the task updates 128 to create new active tasks, such as new stories, associated with the tests.

The new tasks 116 created at block 410 can be assigned to software developers in the software development management platform 102. Accordingly, the software developers can work on the assigned tasks 116 to investigate why the tests have been consistently failing and attempt to resolve any issues with the tests 104, the software application 106, and/or other systems that may be preventing the tests from passing.

If the failed test list 118 does not identify any consistently-failing tests that are not already associated with active tasks 116 (Block 408—No), or if the failed test list 118 does identify such consistently-failing tests and the task updater 114 creates new active tasks 116 for those tests at block 410, the task updater 114 can move to block 412. At block 412, the task updater 114 can determine whether any of the current active tasks 116 identified in the task list 126 received at block 406 are associated with tests that are not identified in the failed test list 118.

If the task list 126 includes active tasks 116 that are associated with one or more tests that are not identified in the failed test list 118 (Block 412—Yes), those tests may no longer be consistently failing. Accordingly, the task updater 114 can close the active tasks 116 associated with those tests in the software development management platform 102 at block 414. The task updater 114 can, for example, transmit task updates 128 requesting that the software development management platform 102 close the tasks 116 associated with the tests, or otherwise change the tasks 116 associated with the tests from an active state to an inactive state.

As an example, the failed test detector 110 may have previously determined that a particular test was consistently failing, and may have identified that particular test in a previous failed test list. The task updater 114 may have created an active task associated with the particular test in the software development management platform 102 based on the previous failed test list. However, although that particular test may previously have been consistently failing, at least one EOT file in the latest EOT file set analyzed by the failed test detector 110 may have indicated that the particular test passed, such that the particular test is no longer a consistently-failing test. Accordingly, the failed test detector 110 may have omitted the particular test from the failed test list 118 received by the task updater at block 402. The task updater 114 can accordingly close the task associated with the particular test in the software development management platform 102, because the particular test is no longer consistently failing, and it may be likely that issues that were previously preventing the particular test from passing have been resolved.

By closing active tasks 116 associated with tests that are not identified in the failed test list 118, and that were not determined to be consistently failing by the failed test detector 110, the tasks 116 can be removed as pending tasks assigned to software developers and/or can be removed as assignable tasks 116. Accordingly, software developers can be assigned to work on the new tasks 116 created at block 410, other previously-existing active tasks 116 associated with other tests that are still be consistently failing, or other types of tasks 116, instead of investigating issues with tests that have likely already been resolved because the tests are no longer failing consistently.

If the task list 126 does not include any active tasks 116 that are associated with tests that are not identified in the failed test list 118 (Block 412—No), or if the task list 126 does include such active tasks 116 and the task updater 114 closes those tasks 116 at block 414, the task updater 114 can return to block 402 to receive a new failed test list from the failed test detector 110. Accordingly, the task updater 114 can repeat process 400 to further update tasks 116 at the software development management platform 102 based on different failed test lists generated and provided by the failed test detector 110.

Figure 5:
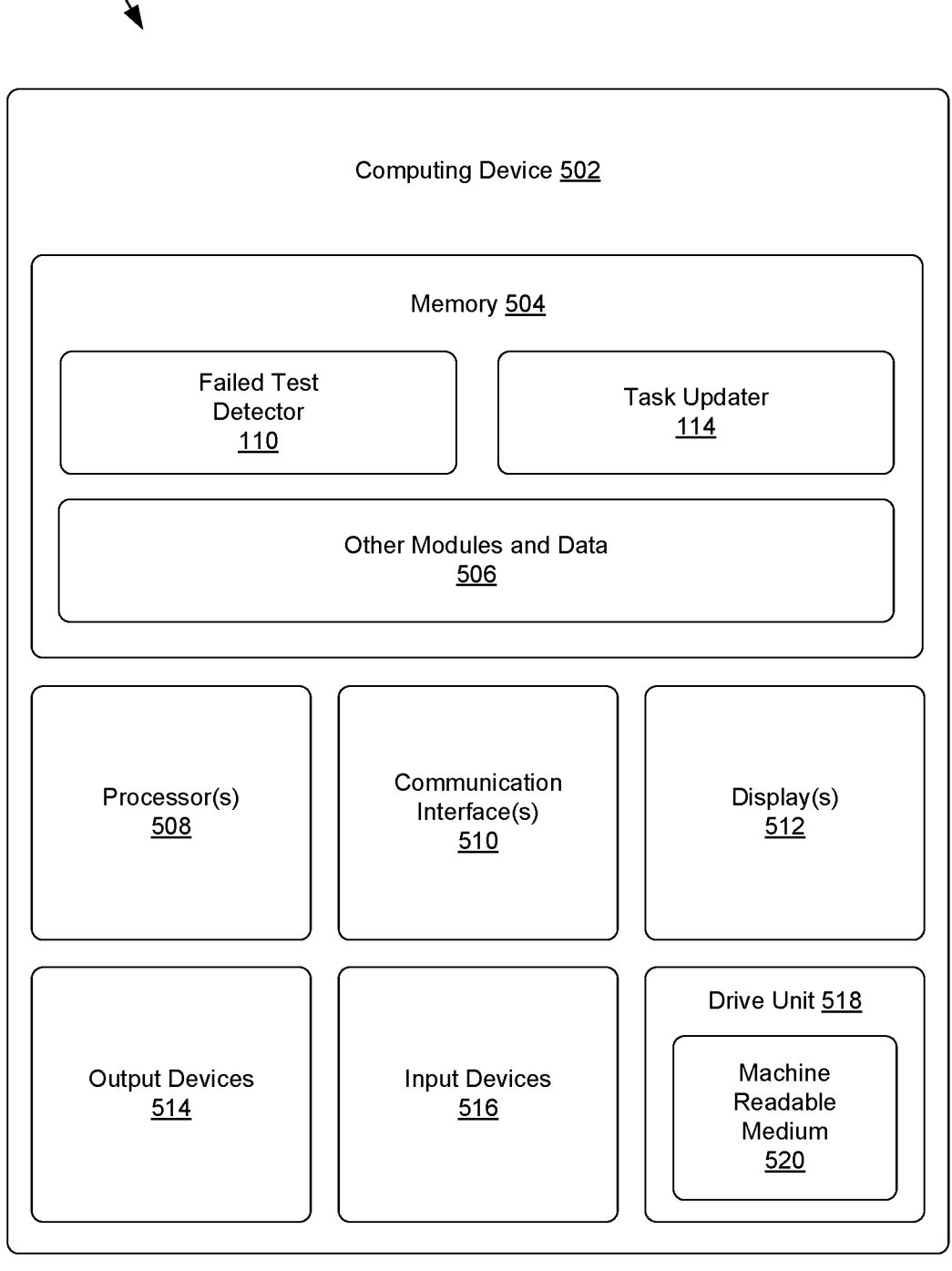
FIG. 5 shows an example system architecture for a computing device associated with the system.

FIG. 5 shows an example system architecture 500 for a computing device 502 associated with the system 100 described herein. The computing device 502 can be a server, computer, or other type of computing device that executes one or more portions of the system 100, such as a computing device that executes the failed test detector 110 and/or the task updater 114. In some examples, the same or a different computing device can also execute the test system 108 and/or the software development management platform 102, and/or store the EOT repository 122. In some examples, elements of the system 100 can be distributed among, and/or be executed by, multiple computing devices. For instance, in some examples, the failed test detector 110 can be executed by a first computing device, while the task updater 114 is executed by a second computing device.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store computer-executable instructions and other data associated with the failed test detector 110 and/or the task updater 114. The memory 504 can also store other modules and data 506. The other modules and data 506 can be utilized by the computing device 502 to perform or enable performing any action taken by the computing device 502. For example, the other modules and data 506 can include a platform, operating system, and/or applications, as well as data utilized by the platform, operating system, and/or applications.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, network interfaces, antennas, wireless communication interfaces, and/or other components that can transmit and/or receive data over networks or other data connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

Overall, the system 100 described herein can automatically update tasks 116 associated with consistently-failing tests in the software development management platform 102 by creating new tasks 116 associated with tests 104 that have been newly identified as failing consistently, and by closing existing tasks 116 for tests 104 that were failing consistently previously but are no longer failing consistently. The system 100 can automatically update such tasks 116 automatically after new EOT files are generated by the testing system and/or new EOT file sets are received by the failed test detector 110, which may occur on a daily basis or on another frequent basis.

Automatic updates to the tasks 116 tracked by the software development management platform 102 made by the system 100 described herein can improve efficiency and reduce usage of processor cycles, memory, bandwidth, and other computing resources. For example, it may otherwise take a scrum master hours each day to manually review daily-generated EOT files associated with hundreds or thousands of tests, compare the new EOT files against older EOT files to determine which of those tests are consistently failing or are no longer consistently failing, and manually create or close corresponding tasks in the software development management platform 102. However, the system 100 described herein can automatically determine which tests are consistently failing and update corresponding tasks 116 in the software development management platform 102 in seconds or minutes, based on a new EOT file set that includes a most recent EOT file. Accordingly, usage of processor cycles, memory, bandwidth, and other computing resources that might otherwise be used by the scrum master's computer to evaluate daily EOT files and update the software development management platform 102 can be reduced.

Additionally, because the system 100 described herein can more quickly cause corresponding updates to the tasks 116 tracked by the software development management platform 102 after the failed test detector 110 evaluates anew EOT file set, tasks 116 associated with newly-detected consistently-failing tests can be opened more quickly in the software development management platform 102. Accordingly, those tasks 116 can be assigned more quickly to software developers. The software developers may thus also be able to more quickly work on those tasks 116 and investigate and resolve bugs or other issues with the tests 104, the software application 106, and/or other systems that were preventing the tests from passing. Resolving such bugs or other issues more quickly can reduce processor cycles, memory, bandwidth, and other computing resources associated with testing and debugging the software application 106, and/or can cause the software application 106 to operate more reliably once deployed.

Moreover, by automatically closing out existing tasks 116 in the software development management platform 102 that are associated with consistently-failing tests once the failed test detector 110 determines that those tests are no longer failing consistently, software developers can be prevented from initiating work on those or continuing work on those tasks. If a test that was consistently failing is no longer consistently failing, issues that had been preventing the test from passing may have been resolved. Accordingly, by quickly and automatically closing tasks 116 associated with such tests in the software development management platform 102, further investigations of the already-resolved issues that had been preventing the test from passing can be avoided, and usage of processor cycles, memory, bandwidth, and other computing resources during such investigations can also be avoided.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
receiving, by a computing system comprising a processor, a set of evidence of test (EOT) files associated with testing of a software application using a plurality of tests, wherein:
    the software application is repeatedly tested over a period of time by executing the plurality of tests at different times, in association with different test execution instances, during the period of time, and
    different EOT files, of the set of EOT files, respectively indicate results of the plurality of tests in association with the different test execution instances;
retrieving, by the computing system, a task list maintained by a software development management platform, the task list indicating active tasks associated with consistently-failing tests in the plurality of tests;
determining, by the computing system, and based on the task list, that a particular test in the plurality of tests:
    was previously determined to be consistently failing based on the particular test having failed consistently during a set of multiple sequential test execution instances during the period of time, and is associated with an existing active task in the software development management platform;

determining, by the computing system, that the particular test is no longer failing consistently, based on the set of EOT files indicting that the particular test passed at least once during the period of time after the set of multiple sequential test execution instances; and closing, by the computing system, the existing active task in the software development management platform, based on determining that the particular test is no longer failing consistently.

2. The computer-implemented method of claim 1, wherein the set of EOT files comprises:

a first EOT file indicating first results of the plurality of tests executed at a first time against a first version of the software application; and a second EOT file indicating second results of the plurality of tests executed at a second time against a second version of the software application.

3. The computer-implemented method of claim 1, further comprising:

identifying, by the computing system, a consistently-failing test in the plurality of tests, by determining that the set of EOT files indicates that the consistently-failing test failed consistently throughout the period of time;

determining, by the computing system, that none of the active tasks indicated by the task list are associated with the consistently-failing test identified based on the set of EOT files; and creating, by the computing system, a new task associated with the consistently-failing test in the software development management platform.

4. The computer-implemented method of claim 1, wherein the active tasks indicated by the task list are assignable to one or more developers in the software development management platform.

5. The computer-implemented method of claim 1, wherein:

the set of EOT files is received from an EOT repository, the EOT repository stores EOT files received from a testing system, and the testing system is configured to repeatedly execute the plurality of tests against the software application at the different times throughout the period of time.

6. The computer-implemented method of claim 1, wherein the set of EOT files is received based on user input indicating a data storage location that stores the set of EOT files.

7. The computer-implemented method of claim 1, wherein:

a feature or an epic corresponds with the plurality of tests in the software development management platform, stories, associated with the feature or the epic, correspond with the consistently-failing tests in the software development management platform, and the active tasks indicated by the task list correspond with the stories.

8. A computing system, comprising:

one or more processors; and memory storing computer-executable instructions that, when executed by the one or more processors, cause the one or more processors to perform operations comprising:

receiving a set of evidence of test (EOT) files associated with testing of a software application using a plurality of tests, wherein;

the software application is repeatedly tested over a period of time by executing the plurality of tests at different times, in association with different test execution instances, during the period of time, and different EOT files, of the set of EOT files, respectively indicate results of the plurality of tests in association with the different test execution instances;

generating a failed test list that identifies consistently-failing tests indicated by the set of EOT files, wherein;

the consistently-failing tests includes tests, in the plurality of tests, that failed consistently during multiple sequential test execution instances during the period of time;

retrieving, from a software development management platform, a task list indicating active tasks associated with previously-identified consistently-failing tests in the plurality of tests;

identifying an existing active task, indicated by the task list, that corresponds with a particular test, in the plurality of tests, that was previously determined to be consistently failing;

determining that the particular test is no longer consistently failing, by determining that the particular test is omitted from the failed test list; and closing the existing active task in the software development management platform, based on determining that the particular test is no longer consistently failing.

9. The computing system of claim 8, wherein the operations further comprise:

identifying a consistently-failing test indicated by the failed test list;

determining that none of the active tasks indicated by the task list are associated with the consistently-failing test indicated by the failed test list; and opening a new task associated with the consistently-failing test in the software development management platform.

10. The computing system of claim 8, wherein:

the particular test is a first test, the operations further comprise:

determining that the set of EOT files indicates that a second test, in the plurality of tests, is a consistently-failing test;

determining, based on information received from a watchdog service, that an external component associated with the second test was inaccessible at the different times; and omitting the second test from the failed test list based on the information received from the watchdog service, and omitting the second test from the failed test list avoids prevents a new active task associated with the second test from being automatically opened in the software development management platform.

11. The computing system of claim 8, wherein the active tasks indicated by the task list are assignable to one or more developers in the software development management platform.

12. The computing system of claim 8, wherein the set of EOT files comprises:

a first EOT file indicating first results of the plurality of tests executed at a first time against a first version of the software application; and a second EOT file indicating second results of the plurality of tests executed at a second time against a second version of the software application.

13. The computing system of claim 8, wherein:

a feature or an epic corresponds with the plurality of tests in the software development management platform, stories, associated with the feature or the epic, correspond with the consistently-failing tests in the software development management platform, and the active tasks indicated by the task list correspond with the stories.

14. The computer-implemented method of claim 1, further comprising:

executing, by the computing system, the plurality of tests at the different times in association with the different test execution instances; and generating, by the computing system, and based on execution of the plurality of tests at the different times, the different EOT files.

15. One or more non-transitory computer-readable media storing computer-executable instructions that, when executed by one or more processors, cause the one or more processors to:

receive a set of evidence of test (EOT) files associated with testing of a software application using a plurality of tests, wherein;

the software application is repeatedly tested over a period of time by executing the plurality of tests at different times, in association with different test execution instances, during the period of time, and different EOT files, of the set of EOT files, respectively indicate results of the plurality of tests in association with the different test execution instances;

retrieve a task list, maintained by a software development management platform, indicating active tasks associated with consistently-failing tests in the plurality of tests;

determine, based on the task list, that a particular test in the plurality of tests:

was previously determined to be consistently failing based on the particular test having failed consistently during a set of multiple sequential test execution instances during the period of time, and is associated with an existing active task in the software development management platform;

determine that the particular test is no longer failing consistently, based on the set of EOT files indicating that the particular test passed at least once during the period of time after the set of multiple sequential test execution instances; and close the existing active task in the software development management platform, based on determining that the particular test is no longer failing consistently.

16. The one or more non-transitory computer-readable media of claim 15, wherein the computer-executable instructions further cause the one or more processors to:

identify a consistently-failing test in the plurality of tests, by determining that the set of EOT files indicates that the consistently-failing test failed consistently throughout the period of time;

determine that none of the active tasks indicated by the task list are associated with the consistently-failing test identified based on the set of EOT files; and create a new task associated with the consistently-failing test in the software development management platform.

17. The one or more non-transitory computer-readable media of claim 15, wherein the active tasks indicated by the task list are assignable to one or more developers in the software development management platform.

18. The one or more non-transitory computer-readable media of claim 15, wherein the set of EOT files comprises:

a first EOT file indicating first results of the plurality of tests executed at a first time against a first version of the software application; and a second EOT file indicating second results of the plurality of tests executed at a second time against a second version of the software application.

19. The one or more non-transitory computer-readable media of claim 15, wherein:

a feature or an epic corresponds with the plurality of tests in the software development management platform, stories, associated with the feature or the epic, correspond with the consistently-failing tests in the software development management platform, and the active tasks indicated by the task list correspond with the stories.

20. A system comprising:

means for receiving a set of evidence of test (EOT) files associated with testing of a software application using a plurality of tests, wherein:

the software application is repeatedly tested over a period of time by executing the plurality of tests at different times, in association with different test execution instances, during the period of time, and different EOT files, of the set of EOT files, respectively indicate results of the plurality of tests in association with the different test execution instances;

means for retrieving a task list maintained by a software development management platform, the task list indicating active tasks associated with consistently-failing tests in the plurality of tests;

means for determining, based on the task list, that a particular test in the plurality of tests:

was previously determined to be consistently failing based on the particular test having failed consistently during a set of multiple sequential test execution instances during the period of time, and is associated with an existing active task in the software development management platform;

means for determining that the particular test is no longer failing consistently, based on the set of EOT files indicating that the particular test passed at least once during the period of time after the set of multiple sequential test execution instances; and means for closing the existing active task in the software development management platform, based on determining that the particular test is no longer failing consistently.

* * * * *